United States Patent
Eijsbouts et al.

(10) Patent No.: US 6,635,599 B1
(45) Date of Patent: Oct. 21, 2003

(54) MIXED METAL CATALYST, ITS PREPARATION BY CO-PRECIPITATION, AND ITS USE

(75) Inventors: Sonja Eijsbouts, Nieuwkuijk (NL); Bob Gerardus Oogjen, Almere (NL); Hermannus Willem Homan Free, Hoevelaken (NL); Marinus Bruce Cerfontain, Amsterdam (NL); Kenneth Lloyd Riley, Baton Rouge, LA (US); Stuart Leon Soled, Pittstown, NJ (US); Sabato Miseo, Pittstown, NJ (US)

(73) Assignee: Exxonmobil Research & Engineering Company, Florham Park, NJ (US)

( * ) Notice: Subject to any disclaimer, the term of this patent is extended or adjusted under 35 U.S.C. 154(b) by 0 days.

(21) Appl. No.: 09/482,811

(22) Filed: Jan. 13, 2000

Related U.S. Application Data

(63) Continuation-in-part of application No. 09/231,125, filed on Jan. 15, 1999, now abandoned, and a continuation-in-part of application No. 09/231,155, filed on Jan. 15, 1999, now abandoned, which is a continuation-in-part of application No. 08/900,389, filed on Jul. 15, 1997, now Pat. No. 6,156,695.

(51) Int. Cl.$^7$ .................... B01J 23/00; B01J 27/047; B01J 27/051; B01J 27/049; B01J 27/043
(52) U.S. Cl. .................. 502/305; 502/221; 502/220; 502/219; 502/222; 502/223; 502/315; 502/313; 502/316
(58) Field of Search ................ 502/305, 313, 502/315, 316, 325, 229, 223

(56) References Cited

U.S. PATENT DOCUMENTS

| | | | | |
|---|---|---|---|---|
| 2,873,257 A | | 2/1959 | Hunter et al. ............... 252/465 |
| 3,198,753 A | * | 8/1965 | Traina ........................ 502/316 |
| 3,280,040 A | | 10/1966 | Jaffe ........................... 252/439 |
| 3,408,309 A | * | 10/1968 | Gessner ...................... 502/316 |
| 3,619,414 A | * | 11/1971 | Mills et al. .................. 502/315 |
| 3,678,124 A | | 7/1972 | Stepanov et al. ........... 260/680 |
| 3,861,005 A | * | 1/1975 | Steinmetz et al. .......... 208/111 |
| 3,959,179 A | * | 5/1976 | Mikovsky et al. ...... 252/455 Z |
| 4,013,545 A | * | 3/1977 | Hilfman ...................... 208/111 |
| 4,014,925 A | * | 3/1977 | Ferlazzo et al. ........ 260/486 R |
| 4,181,602 A | * | 1/1980 | Quick et al. ........... 208/216 PP |
| 4,388,223 A | * | 6/1983 | Ferlazzo et al. ............ 502/316 |
| 4,491,639 A | * | 1/1985 | Happel et al. .............. 502/219 |
| 4,596,785 A | * | 6/1986 | Toulhoat et al. ............ 502/313 |
| 4,720,477 A | * | 1/1988 | Hettinger, Jr. .............. 502/255 |
| 4,748,142 A | * | 5/1988 | Chianelli et al. ........... 502/220 |
| 4,808,563 A | * | 2/1989 | Velenyi ....................... 502/241 |
| 4,820,677 A | | 4/1989 | Jacobson et al. ........... 502/220 |
| 5,002,919 A | * | 3/1991 | Yamazaki et al. .......... 502/316 |
| 5,244,858 A | * | 9/1993 | Usui et al. ................... 502/220 |
| 5,565,091 A | * | 10/1996 | Iino et al. ............... 208/216 R |
| 6,156,695 A | * | 12/2000 | Soled et al. ................. 502/305 |

FOREIGN PATENT DOCUMENTS

| | | | |
|---|---|---|---|
| EP | 0 379 433 | 7/1990 | ............ B01J/23/88 |
| EP | 0 469 675 | 2/1992 | .......... B01J/27/188 |

OTHER PUBLICATIONS

*Molybdenum Chemicals*, G.A. Tsigdinos and C.J. Hallada, *Isopoly Compounds of Molybdenum, Tungsten, and Vanadium*, Bulletin Cdb–14, Feb. 1969, pp. 1–20.
*Molybdenum Chemicals*, G.A. Tsigdinos, *Heteropoly Compounds Of Molybdenum And Tungsten*, Bulletin Cdb–12a (Revised), Nov. 1969, pp. 1–24.
*Journal of Catalysis*, M. Daage and R. R. Chianelli, *Structure Relations in Molybedenum Sulfide Catalysts: The "Rim–Edge" Model*, 149, pp. 414–427 Jun. 1994.
*Japanese Patent Abstract 09000929*, Jun. 10, 1995.

\* cited by examiner

*Primary Examiner*—Mark L. Bell
*Assistant Examiner*—Patricia L. Hailey
(74) *Attorney, Agent, or Firm*—Louis A. Morris

(57) ABSTRACT

The present invention relates to a process for the preparation of a hydroprocessing catalyst, to the catalyst composition obtainable by said process, and to the use of said catalyst composition in hydroprocessing applications. The process comprises the steps of combining and reacting at least one Group VIII non-noble metal component in solution and at least two Group VIB metal components in solution in a reaction mixture to obtain an oxygen-stable precipitate, and sulfiding the precipitate.

34 Claims, No Drawings

MIXED METAL CATALYST, ITS PREPARATION BY CO-PRECIPITATION, AND ITS USE

RELATED U.S. APPLICATION DATA

Continuation-in-Part of Ser. No. 09/231,155, filed Jan. 15, 1999, now abandoned and Ser. No. 09/231,125, filed Jan. 15, 1999, also now abandoned which is a continuation-in-part of Ser. No. 08/900,389, filed Jul. 15, 1997, now U.S. Pat. No. 6,156,695.

FIELD OF THE INVENTION

The invention relates to a process for the preparation of a hydroprocessing catalyst, to the catalyst composition obtainable by said process, and to the use of said catalyst composition in hydroprocessing applications.

BACKGROUND OF THE INVENTION

In the hydroprocessing of hydrocarbon feedstocks, the feedstocks are hydrotreated and/or hydrocracked in the presence of hydrogen. Hydroprocessing encompasses all processes in which a hydrocarbon feed is reacted with hydrogen at elevated temperature and elevated pressure, including processes such as hydrogenation, hydrodesulfurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking.

In general, hydroprocessing catalysts are composed of a carrier with a Group VIB metal component and a Group VIII non-noble metal component deposited thereon.

Generally, such catalysts are prepared by impregnating a carrier with aqueous solutions of compounds of the metals in question, followed by one or more drying and calcination steps. Such a catalyst preparation process is described, e.g., in U.S. Pat. No. 2,873,257 and EP 0 469 675.

Another possibility is to coprecipitate the carrier material with one Group VIB. and one Group VIII non-noble metal component as, e.g., disclosed in U.S. Pat. No. 3,280,040. As the carrier itself has no or little catalytic activity, the activity of the above carrier-containing catalysts in hydroprocessing is rather moderate. It is therefore an object of the present invention to provide a catalyst, which can be applied without a carrier. Such carrier-free catalysts are generally referred to as bulk catalysts.

The preparation of bulk catalysts is known from, e.g., EP 0 379 433, where one Group VIII non-noble metal component and one Group VIB metal component are co-precipitated.

It is noted that all the above catalysts comprise one Group VIII non-noble metal and one Group VIB metal. Such catalysts have only moderate activity in hydroprocessing. It is therefore an object of the present invention to provide catalysts with increased catalytic activity.

A more recent development is the application of catalysts comprising one Group VIII non-noble metal and two Group VIB metals.

Such a catalyst is disclosed in, e.g., JP 09000929, U.S. Pat. No. 4,596,785, U.S. Pat. No. 4,820,677, and U.S. Pat. No. 3,678,124.

The catalyst of JP 09000929, which is a carrier-containing catalyst, is prepared by impregnating an inorganic support with cobalt or nickel as Group VIII non-noble metal and molybdenum and tungsten as Group VIB metals.

The catalyst of U.S. Pat. No. 4,596,785 comprises the disulfides of at least one Group VIII non-noble metal and at least one Group VIB metal. The catalyst of U.S. Pat. No. 4,820,677 is an amorphous sulfide comprising iron as Group VIII non-noble metal and a metal selected from molybdenum, tungsten or mixtures thereof as Group VIB metal, as well as a polydentate ligand such as ethylene diamine. In both references the catalyst is prepared via co-precipitation of water-soluble sources of one Group VIII non-noble metal and two Group VIB metals in the presence of sulfides. The sulfidic precipitate is isolated, dried, and calcined. All process steps have to be performed in an inert atmosphere, which means that sophisticated techniques are required to carry out this process, in order not to convert the metal sulfides into their oxides. It is therefore a further object of the present invention to provide a process which is technically simple and robust and which does not require any handling under an inert atmosphere during the preparation of the catalyst.

U.S. Pat. No. 3,678,124 discloses oxidic bulk catalysts to be used in oxidative dehydrogenation of paraffin hydrocarbons. The catalysts are prepared by co-precipitating water-soluble components of the corresponding metals.

SUMMARY OF THE INVENTION

It has surprisingly been found that the above objectives can be met by a catalyst preparation process which, in one embodiment, comprises the steps of combining and reacting at least one Group VIII non-noble metal component in solution and at least two Group VIB metal components in solution in a reaction mixture to obtain an oxygen-stable precipitate and subjecting the precipitate to a sulfidation step.

In another embodiment, the present invention comprises a catalyst composition obtained by the above process.

In a further embodiment, the present invention comprises a process for hydroprocessing a hydrocarbon feedstock that uses the above catalyst composition.

Other embodiments of the present invention encompass further details relating to the catalyst preparation process, further ingredients in the catalyst composition and further details concerning the process for use of the catalyst, all of which are hereinafter disclosed in the following discussion of each of those facets of the invention.

DETAILED DESCRIPTION OF THE INVENTION

Catalyst Preparation Process

The present invention pertains to a process for preparing a catalyst composition comprising sulfidic bulk catalyst particles comprising at least one Group VIII non-noble metal and at least two Group VIB metals which comprises the following process steps (i) combination and reaction of at least one Group VIII non-noble metal component in solution and at least two Group VIB metal components in solution in a reaction mixture to obtain an oxygen-stable precipitate, and (ii) sulfidation of the precipitate.

Process Step (i)

It is essential to the process of the present invention that the metal components are completely dissolved when they are combined and/or reacted to form a precipitate. It is possible, e.g., to combine the metal components when they are already in the dissolved state and then have them react to form a precipitate. However, it is also possible to combine one or more of the metal components, which are partly, or entirely in the solid state with further metal components. However, in this case, care must be taken that the metal components, which are partly or entirely in the solid state will dissolve when present in the reaction mixture. In other words, at least once during process step (i), all metal components must be present wholly as a solution. In cases where metal components are combined partly or entirely in the solid state, the metals are actively dissolved in the reaction mixture, for instance by stirring, increasing the amount of solvent, changing the solvent, changing the temperature, or changing the pH or adding a complexing agent which leads to the formation of a soluble complex of the metal.

As stated above, the reaction mixture is reacted to obtain an oxygen-stable precipitate. Precipitation can be effected by, e.g., (a) changing the pH during or after combination of the metal component solutions to such a value that precipitation is induced;

(b) adding a complexing agent during or after combination of the metal component solutions, which complexing agent complexes one or more of the metals to prevent. precipitation of the metals, and thereafter changing the reaction conditions, such as temperature or pH, such that the complexing agent releases the metals for precipitation;

(c) adjusting the temperature during or after combination of the metal component solutions to such a value that precipitation is induced;

(d) lowering the amount of solvent during or after combination of the metal component solutions such that precipitation is induced;

(e) adding a non-solvent during or after combination of the metal component solutions to induce precipitation thereof, with a non-solvent meaning that the precipitate is essentially not, soluble in this solvent; or (f) adding an excess of either of the components to such an extent that precipitation is induced.

Adjusting the pH in, e.g., options (a) or (b) can be done by adding a base or an acid to the reaction mixture. However, it is also possible to add compounds which upon the temperature increasing will decompose into hydroxide ions or $H^+$ ions, which increase and decrease the pH, respectively. Examples of compounds, which will decompose upon the temperature increasing and will thereby increase or decrease the pH are urea, nitrites, ammonium cyanate, ammonium hydroxide, and ammonium carbonate.

As will be clear from the above, it is possible to add the Group VIII non-noble metal component and the Group VIB metal component in various ways: at various temperatures and pHs, in solution, in suspension, wetted and as such simultaneously and sequentially. Five precipitation methods will be described in more detail:

1) Simultaneous precipitation at a constant pH, in which process at least one Group VIII non-noble metal component in solution or as such is added slowly to a reaction vessel containing protic liquid which is kept at a constant temperature, with the pH being kept constant by adding a base containing Group VIB metal component solution. The pH is set such that (at the chosen reaction temperature) precipitation occurs.

2) Simultaneous precipitation, in which process both the Group VIII non-noble metal component and the Group VIB metal component are added slowly and simultaneously to a reaction vessel containing protic liquid and a compound which decomposes upon the temperature being increased and thereby increases or decreases the pH. After the addition of the metal components, the temperature of the reaction vessel is adjusted to the decomposition temperature of said compound, resulting in precipitation due to pH change.

3) Precipitation, in which process the Group VIII non-noble metal component is added slowly to a reaction vessel containing Group VIB metal component dissolved in protic liquid (or vice versa) and a compound which will decompose upon the temperature increasing and will thereby increase or decrease the pH. After the addition of the Group VIII non-noble metal component, the temperature of the reaction vessel is adjusted to the decomposition temperature of said compound, resulting in precipitation due to pH change.

4) Precipitation at a constant pH, in which process the Group VIII non-noble metal component is added slowly to a reaction vessel containing Group VIB metal component dissolved in protic liquid or vice versa. By adding acid or base to the reaction vessel the pH is adjusted such that either during or after the addition of the Group VIII non-noble metal component (at the chosen reaction temperature) precipitation occurs.

5) Solution of the metal components each in its own water of crystallization with subsequent evaporation of the water so that precipitation occurs. In this method the Group VIII non-noble metal component and the Group VIB metal component are mixed in a reaction vessel and heated. After solution of the metals the water is evaporated, optionally under vacuum, to effect precipitation.

As stated above, the metal components can be added to the reaction mixture in solution, suspension, wetted, or as such. Of course, if they are added as a suspension, wetted or as such, they must dissolve in the reaction mixture. Preferably, the metal components are added in the form of their solutions.

As solvent in the above process may be used any protic liquid such as water, carboxylic acids, lower alcohols such as ethanol, propanol or mixtures thereof. Of course, a protic liquid must be chosen which does not interfere with the precipitation reaction.

At least one Group VIII non-noble metal component and at least two Group VIB metal components are applied in the process of the invention. Suitable Group VIII non-noble metals include cobalt, nickel, iron, or mixtures thereof, preferably cobalt and/or nickel. Suitable Group VIB metal components include molybdenum, tungsten, chromium, or mixtures thereof, and preferably a combination of molybdenum and tungsten. Preferably, combinations of nickel/molybdenum/tungsten, cobalt/molybdenum/tungsten or nickel/cobalt/molybdenum/tungsten are used. These types of precipitates have a higher surface area than precipitates prepared from one Group VIII non-noble metal and one Group VIB metal.

It is preferred that nickel and cobalt make up at least 50 wt % of the total of Group VIII non-noble metal components, calculated as oxides, more preferably at least 70 wt %, still more preferably at least 90 wt %. It may be especially preferred for the Group VIII non-noble metal component to consist essentially of nickel and/or cobalt.

It is preferred that molybdenum and tungsten make up at least 50 wt % of the total of Group VIB metal components, calculated as trioxides, more preferably at least 70 wt %, still more preferably at least 90 wt %. It may be especially preferred for the Group VIB metal component to consist essentially of molybdenum and tungsten.

Suitable Group VIII non-noble metal components include water-soluble Group VIII non-noble metal salts. Examples include nitrates, hydrated nitrates, chlorides, hydrated chlorides, sulphates, hydrated sulphates, formates, acetates, or hypophosphites. Examples include water-soluble nickel and/or cobalt components, e.g. water-soluble nickel and/or cobalt salts such as nitrates, sulfates, acetates, chlorides, formates or mixtures thereof of nickel and/or cobalt as well as nickel hypophosphite. Suitable iron components to be added in the solute state comprise iron acetate, chloride, formate, nitrate, sulphate or mixtures thereof.

Suitable Group VIB metal components include water-soluble Group VIB metal salts such as normal ammonium or alkali metal monomolybdates and tungstates as well as water-soluble isopoly-compounds of molybdenum and tungsten, such as metatungstic acid, or water-soluble heteropoly compounds of molybdenum or tungsten comprising further, e.g., P, Si, Ni, or Co or combinations thereof. Suitable water-soluble isopoly- and heteropoly compounds are given in Molybdenum Chemicals, Chemical data series, Bulletin Cdb-14, February 1969 and in Molybdenum Chemicals, Chemical data series, Bulletin Cdb-12a-revised, November 1969. Suitable water-soluble chromium compounds are, e.g., normal chromates, isopolychromates and ammonium chromium sulphate.

Suitable metal salts which are only soluble at higher temperatures are, e.g., heteropoly compounds of molybdenum or tungsten further comprising, e.g., cobalt or nickel, or metal components which contain so much water of crystallization that upon the temperature increasing the metal component will dissolve in its own water of crystallization.

The molar ratio of Group VIB to Group VIII non-noble metals generally ranges from 10:1–1:10 and preferably from 3:1–1:3. The ratio of the different Group VIB metals to one another generally is not critical. The same holds when more than one Group VIII non-noble metal is applied. In cases where molybdenum and tungsten are present as Group VIB metals, the molybenum: tungsten ratio preferably lies in the range of 9:1–1:19, more preferably 3:1–1:9, and most preferably 3:1–1:6.

It is essential that the reaction mixture be in the liquid phase during the reaction. Reaction temperatures and pressures are selected in such a way that this is ensured.

It is possible to carry out the reaction at ambient temperature. Generally, it is of course preferred to keep the temperature below the atmospheric boiling point of the reaction mixture during the reaction to ensure easy handling of the components. Preferably, the temperature is chosen to be between ambient temperature and the atmospheric boiling temperature. However, if desired, also temperatures above the atmospheric boiling point of the reaction mixture can be applied. Above the atmospheric boiling temperature of the reaction mixture, the reaction generally is carried out at increased pressure, preferably in an autoclave and/or static mixer.

As set out above, during step (i) precipitation is induced, e.g., by pH change. The skilled person will know suitable pH values at which the metal components precipitate.

It is essential to the process of the invention that the precipitate resulting from step (i) is oxygen-stable, meaning that the precipitate does not react with oxygen under the conditions of the process of the present invention if oxygen is present. A precipitate comprising any sulfide or thiosalts is not oxygen-stable and thus a process for preparing such a precipitate is excluded by the present invention. That the step (i) of the present invention results in an oxygen-stable precipitate has the advantage that the step (i) as well as any subsequent process steps can be carried out in an oxygen-containing atmosphere, such as air, contrary to, e.g., the process of U.S. Pat. No. 4,596,785 or U.S. Pat. No. 4,820,677. This makes the process of the present invention technically robust and simple.

If so desired, a material selected from the group of binder materials, conventional hydroprocessing catalysts, cracking components, or mixtures thereof can be added during the above-described preparation of the precipitate (process step (i)). Details in respect of these materials are given below.

For this process embodiment, the following options are available: the Group VIB and Group VIII non-noble metal components can generally be contacted with any of the above materials during the combination of the metals. They can, e.g., be added to the material either simultaneously or one after the other.

Alternatively, the Group VIB and Group VIII non-noble metal components can be combined as described above, and subsequently any of the above materials can be added to the combined metal components prior to or simultaneously with precipitation. It is further possible to combine part of the Group VIB and Group VIII non-noble metal components either simultaneously or one after the other, to subsequently add the material, and to finally add the rest of the Group VIB and Group VIII non-noble metal components either simultaneously or one after the other.

As stated above, the material to be added during precipitation step (i) can be a binder material. Binder material according to the present invention means a binder and/or a precursor thereof. If a precursor is added in the form of a solution, care must be taken that the binder is converted to the solid state during the process of the invention. This can be done by adjusting the pH conditions in such a way that precipitation of the binder occurs. Suitable conditions for the precipitation of the binder are known to the skilled person and need no further explanation. If the amount of liquid of the resulting catalyst composition is too high, optionally a solid-liquid separation can be carried out.

Additionally, further materials such as phosphorus-containing compounds, boron-containing compounds, silicon-containing compounds, fluorine-containing compounds, additional transition metal compounds, rare earth metal compounds, or mixtures thereof can be added during precipitation step (i) in a similar way to that described for the above materials. Details in respect of these further materials are given below.

Process Step (ii)

The precipitate is subjected to a sulfidation step. Prior to sulphidation, the precipitate generally is isolated from the liquid. Any conventional methods, such as filtration, centrifugation, decantation or (spay-)drying (see below) may be used. Sulfidation can be carried out in the gaseous or the liquid phase. Sulfidation generally is carried out by contacting the precipitate with a sulfur-containing compound such as elementary sulfur, hydrogen sulfide, DMDS, or polysulfides. The sulfidation can generally be carried out in situ and/or ex situ. Preferably, the sulfidation is carried out ex situ, i.e. the sulfidation is carried out in a separate reactor prior to the sulfided catalyst composition being loaded into the hydroprocessing unit. Furthermore, it is preferred that the catalyst composition is sulfided both ex situ and in situ.

Further Optional Process Steps

The process of the present invention can comprise one or more of the following further optional process steps:

(a) a drying step and/or a thermal treatment and/or a washing step, (b) compositing with a material selected from the group of binder materials, conventional hydroprocessing catalysts, cracking components, or mixtures thereof, (c) application of any of the techniques of spray-drying, (flash) drying, milling, kneading, or slurry-mixing, dry or wet mixing, or combinations thereof, or (d) shaping, Optional Process Step (a)

A thermal treatment and/or washing step preferably is applied if the precipitate comprises hazardous compounds such as ammonium nitrate, to remove the hazardous material prior to compositing with any of the above materials (step (b)), prior to applying spray-drying or any alternative technique (step (c)) and/or prior to shaping (step (d)). Such a thermal treatment and/or washing step preferably is applied directly after isolating the precipitate. Further, such a thermal treatment and/or washing step is particularly preferred if the process of the invention comprises spray-drying (step (c)).

A drying step and/or a thermal treatment can (further) be applied, e.g., after step (b), after step (c) and/or after step (d). Preferably, a drying step and a thermal treatment are applied after the shaping step (d).

Drying is generally done in an oxygen-containing atmosphere, such as air. All conventional drying methods are suitable such as oven drying, spray-drying, etc. The precipitate can also be dried at room temperature.

A thermal treatment, such as calcination, if any, generally is carried out in oxygen-containing atmosphere such as air or steam. Preferably, said thermal treatment is conducted at a temperature between 100–600° C., preferably between 150–500° C., more preferably 150–450° C., during a period of time of 0.5–48 hours.

Optional Process Step (b)

Optionally, the precipitate either as such or comprising any of the above (further) materials is composited with a material selected from the group of binder materials, conventional hydroprocessing catalysts, cracking components, or mixtures thereof. The material can be added in the dry state, either thermally treated or not, in the wetted and/or suspended state and/or as a solution. The material preferably is added after the isolation of the precipitate or after the drying step and/or the thermal treatment and/or the washing step (a).

The term "compositing the precipitate with a material" means that the above materials are added to the precipitate or vice versa and the resulting composition is mixed. Mixing is preferably done in the presence of a liquid ("wet mixing"). This improves the mechanical strength of the final catalyst composition.

It has been found that compositing the precipitate with the above materials and/or incorporating the above materials during precipitation step (i) leads to bulk catalyst compositions of particularly high mechanical strength.

As stated above, the material may be selected from a binder material, a conventional hydroprocessing catalyst, a cracking component, or mixtures thereof. These materials will be described in more detail below.

The binder materials to be applied may be any materials conventionally applied as binders in hydroprocessing catalysts. Examples are silica, silica-alumina, such as conventional silica-alumina, silica-coated alumina and alumina-coated silica, alumina such as (pseudo)boehmite, or gibbsite, titania, titania-coated alumina, zirconia, cationic clays or anionic clays such as saponite, bentonite, kaolin, sepiolite or hydrotalcite, or mixtures thereof. Preferred binders are silica, silica-alumina, alumina, titania, titania-coated alumina, zirconia, bentonite, or mixtures thereof. These binders may be applied as such or after peptization.

It is also possible to apply precursors of these binders, which during the process of the invention are converted into any of the above-described binders. Suitable precursors are, e.g., alkali metal aluminates (to obtain an alumina binder), water glass (to obtain a silica binder), a mixture of alkali metal aluminates and water glass (to obtain a silica-alumina binder), a mixture of sources of a di-, tri- and/or tetravalent metal such as a mixture of water-soluble salts of magnesium, aluminium and/or silicon (to prepare a cationic clay and/or anionic clay), aluminium chlorohydrol, aluminium sulphate, aluminium nitrate, aluminium chloride, or mixtures thereof.

If desired, the binder material may be composited with a Group VIB metal-containing compound and/or a Group VIII non-noble metal-containing compound, prior to being composited with the precipitate and/or prior to being added during the preparation thereof. Compositing the binder material with any of these metal-containing compounds may be carried out by impregnation of the binder with these materials. Suitable impregnation techniques are known to the person skilled in the art. If the binder is peptized, it is also possible to carry out the peptization in the presence of Group VIB and/or Group VIII non-noble metal-containing compounds.

If alumina is applied as binder, the surface area of the alumina generally lies in the range of 50–600 $m^2/g$ and preferably 100–450 $m^2/g$, as measured by the B.E.T. method. The pore volume of the alumina preferably is in the range of 0.1–1.5 ml/g, as measured by nitrogen adsorption. Before the characterization of the alumina, it is thermally treated at 600° C. for 1 hour.

Generally, the binder material to be added in the process of the invention has less catalytic activity than the bulk catalyst composition resulting from the precipitate as such or no catalytic activity at all. Consequently, by adding a binder material, the activity of the bulk catalyst composition may be reduced. Furthermore, the addition of binder material leads to a considerable increase in the mechanical strength of the final catalyst composition. Therefore, the amount of binder material to be added in the process of the invention generally depends on the desired activity and/or desired mechanical strength of the final catalyst composition. Binder amounts from 0–95 wt % of the total composition can be suitable, depending on the envisaged catalytic application. However, to take advantage of the resulting unusually high activity of the composition of the present invention, the binder amounts to be added generally are in the range of 0–75 wt % of the total composition, preferably 0–50 wt %, more preferably 0–30 wt %.

Conventional hydroprocessing catalysts which may be added to the catalyst composition are, e.g., conventional hydrodesulfurization, hydrodenitrogenation or hydrocracking catalysts. These catalysts can be added in the used, regenerated, fresh, or sulfided state. If desired, the conventional hydroprocessing catalyst may be milled or treated in any other conventional way before being applied in the process of the invention.

Cracking components which may be added to the catalyst composition according to the invention present are any conventional cracking component such as cationic clays, anionic clays, crystalline cracking components such as zeolites, e.g., ZSM-5, (ultra-stable) zeolite, Y, zeolite X, ALPOs, SAPOs, MCM-41, amorphous cracking components such as silica-alumina, or mixtures thereof. It will be clear that some materials may act as binder and cracking component at the same time. For instance, silica-alumina may have a cracking and a binding function at the same time.

If desired, the cracking component may be composited with a Group VIB metal and/or a Group VIII non-noble metal prior to being composited with the precipitate and/or prior to being added during precipitation step (i). Compositing the cracking component with any of these metals may be take the form of impregnation of the cracking component with these materials.

Generally, it depends on the envisaged catalytic application of the final catalyst composition which of the above-described cracking components, if any, is added. A crystalline cracking component is preferably added if the resulting composition is to be applied in hydrocracking. Other cracking components such as silica-alumina or cationic clays are preferably added if the final catalyst composition is to be used in hydrotreating applications or mild hydrocracking. The amount of cracking material, which is added, depends on the desired activity of the final composition and the application envisaged, and thus may vary from 0 to 90 wt %, based on the total weight of the catalyst composition.

Optionally, further materials, such as phosphorus-containing compounds, boron-containing compounds, silicon-containing compounds, fluorine-containing compounds, additional transition metal compounds, rare earth metal compounds, or mixtures thereof may be incorporated into the catalyst composition.

As phosphorus-containing compounds may be applied ammonium phosphate, phosphoric acid or organic phosphorus-containing compounds. Phosphorus-containing compounds can be added at any stage of the process of the present invention prior to the shaping step and/or subsequent to the shaping step. If the binder is peptized, phosphorus-containing compounds can also be used for peptization. For instance, the alumina binder can be peptized by being contacted with phosphoric acid or with a mixture of phosphoric acid and nitric acid.

As boron-containing compounds may be applied, e.g., boric acid or heteropoly compounds of boron with molybdenum and/or tungsten and as fluorine-containing compounds may be applied, e.g., ammonium fluoride. Typical silicon-containing compounds are water glass, silica gel, tetraethylorthosilicate or heteropoly compounds of silicon with molybdenum and/or tungsten. Further, compounds such as fluorosilicic acid, fluoroboric acid, difluorophosphoric acid or hexafluorophosphoric acid may be applied if a combination of F with Si, B and P, respectively, is desired.

Suitable additional transition metals are, e.g., rhenium, manganese, ruthenium, rhodium, iridium, chromium, vanadium, iron, platinum, palladium, niobium, titanium, zirconium, cobalt, nickel, molybdenum, or tungsten. These metal compounds can be added at any stage of the process of the present invention prior to the shaping step. Apart from adding these metals during the process of the invention, it is also possible to composite the final catalyst composition therewith. Thus it is possible to impregnate the final catalyst composition with an impregnation solution comprising any of these metals.

Optional Process Step (c)

The precipitate optionally comprising any of the above (further) materials further can be subjected to spray-drying, (flash) drying, milling, kneading, or slurry-mixing, dry or wet mixing, or combinations thereof, with a combination of wet mixing and kneading or slurry mixing and spray-drying being preferred.

Step (c) is particularly attractive when any of the above materials (binder, conventional hydroprocessing catalyst, cracking component) are present to ensure a high degree of mixing between the precipitate and any of these materials. This is the case in particular when step (c) is applied after the incorporation of any of these materials (step (b)).

Spray-drying typically is carried out in an oxygen-containing atmosphere at an outlet temperature in the range of 100–200° C. and more preferably 120–180° C.

Dry mixing means mixing the precipitate in the dry state with any of the above materials in the dry state. Wet mixing, e.g., comprises mixing the wet filter cake obtained after isolating the precipitate via filtration with any of the above materials as powders or wet filter cake to form a homogenous paste thereof.

Optional Process Step (d)

If so desired, the precipitate optionally comprising any of the above (further) materials may be shaped, optionally after step (c) and prior to sulphiding (step (ii)). Shaping comprises extrusion, pelletizing, beading and/or spray-drying. It must be noted that if the catalyst composition is to be applied in slurry-type reactors, fluidized beds, moving beds, or expanded beds, generally spray-drying or beading is applied. For fixed bed or ebullating bed applications, generally the catalyst composition is extruded, pelletized and/or beaded. In the latter case, at any stage prior to or during the shaping step, any additives, which are conventionally used to facilitate shaping, can be added. These additives may comprise aluminium stearate, surfactants, graphite, starch, methyl cellulose, bentonite, polyethylene glycols, polyethylene oxides or mixtures thereof. Further, when alumina is used as binder, it may be desirable to add acids such as nitric acid prior to the shaping step to increase the mechanical strength of the extrudates.

If the shaping step comprises extrusion, beading and/or spray-drying, it is preferred that the shaping step is carried out in the presence of a liquid, such as water. For extrusion and beading, the amount of liquid in the shaping mixture, expressed as LOI, preferably is in the range of 20–80%.

If so desired, coaxial extrusion of any of the above materials with the precipitate, optionally comprising any of the above materials, can be applied. More in particular, two mixtures can be co-extruded, in which case the precipitate optionally comprising any of the above materials is present in the inner extrusion medium while any of the above materials without the precipitate is present in the outer extrusion medium, or vice versa.

In all the above process steps the amount of liquid must be controlled. If, e.g., prior to subjecting the catalyst composition to spray-drying the amount of liquid is too low, additional liquid must be added. If, on the other hand, e.g., prior to extrusion of the catalyst composition the amount of liquid is too high, the amount of liquid must be reduced by, e.g., solid-liquid separation via, e.g., filtration, decantation, or evaporation and, if necessary, the resulting material can be dried and subsequently re-wetted to a certain extent. For all the above process steps, it is within the scope of the skilled person to control the amount of liquid appropriately.

A preferred process of the present invention thus comprises the following successive process steps:

(i) preparing a precipitate as described above, optionally in the presence of any of the above (further) materials, and isolating the resulting precipitate,
    (a) optionally drying, thermally treating and/or washing the isolated precipitate, in particular to remove hazardous materials,
    (b) optionally compositing the precipitate of step (i) or (a) with any of the above (further) materials,
    (c) optionally subjecting the resulting composition to any of the techniques of spray-drying, (flash) drying, milling, kneading, slurry-mixing, dry or wet mixing, or combinations thereof,
    (d) optionally shaping the catalyst composition,
    (a') optionally drying and/or thermally treating the shaped catalyst composition, and
(ii) sulphiding the catalyst composition.

A typical process comprises the successive process steps of preparing the precipitate as described above, slurry-mixing the precipitate with a binder, spray-drying, rewetting, kneading, extrusion, drying, calcining and sulphiding. Another typical example of the process of the present invention comprises the successive steps of preparing the precipitate as described above, isolating the resulting precipitate by filtration, wet mixing the filter cake with a binder, kneading, extrusion, drying, calcining and sulphiding.

Catalyst Composition of the Invention

The present invention further relates to a catalyst composition obtainable by the process of the present invention.

Further, the present invention is directed to a catalyst composition comprising sulfidic bulk catalyst particles which comprise at least one Group VIII non-noble metal component and at least two Group VIB metal components and wherein the degree of sulfidation under conditions of use does not exceed 90%

It is noted that the catalyst compositions of the present invention have a much better catalytic performance than catalysts comprising one Group VIII non-noble metal and only one Group VIB metal.

It is essential that the degree of sulfidation of the sulfidic bulk catalyst particles under conditions of use does not exceed 90%. Preferably the degree of sulfidation under conditions of use is in the range of 10–90%, more preferably of 20–90%, and most preferably of 40–90%. The degree of sulfidation is determined as described below under the heading "characterization methods".

If conventional sulfidation techniques are applied in the process of the present invention, the degree of sulfidation of the sulfidic bulk catalyst particles prior to use is essentially identical to the degree of sulfidation under conditions of use. However, if very specific sulfidation techniques are applied, it might be that the degree of sulfidation prior to the use of the catalyst is higher than during the use thereof, as during use part of the sulfides or elemental sulfur is removed from the catalyst. In this case the degree of sulfidation is the one that results during the use of the catalyst and not prior thereto. The conditions of use are those described below under the heading "use according to the invention". That the catalyst is "under conditions of use" means that it is subjected to these conditions for a time period long enough to get the catalyst in equilibrium with its reaction environment.

It is further preferred that the catalyst composition of the present invention is essentially free of Group VIII non-noble metal disulfides. More in particular, the Group VIII non-noble metals are preferably present as (Group VIII non-noble metal)$_y$S$_x$, with x/y being in the range of 0.5–1.5.

The materials typically have characteristic X-ray diffraction patterns.

E.g., the X-ray diffraction pattern of a catalyst of the invention containing nickel as Group VIII non-noble metal and molybdenum and tungsten as Group VIB metals typically comprises peaks at 2θ=13.1–14.9°, 27.0–27.6°, 30.9–31.5°, 33.1–34.0°, 50.2–50.8°, 50.6–51.2°, 55.2–55.8°, 58.1–59.7°, with the peaks at 2θ=50.2–50.8° and 50.6–51.2° being overlapping. On the basis of this diffraction pattern it can be concluded that the metals are present in the form of nickel sulfide (Ni$_7$S$_6$), molybdenum disulfide, and tungsten disulfide.

The X-ray diffraction pattern of a catalyst of the invention containing cobalt as Group VIII non-noble metal and molybdenum and tungsten as Group VIB metals typically comprises peaks at 2θ=13.1–14.9°, 29.5–30.1°, 33.1–34.0°, 47.2–47.8°, 51.7–52.3°, and 58.1–59.7. On the basis of this diffraction pattern it can be concluded that cobalt, molybdenum, and tungsten are present as cobalt sulfide (Co$_9$S$_8$), molybdenum disulfide, and tungsten disulfide.

The X-ray diffraction pattern of a catalyst of the invention containing iron as Group VIII non-noble metal and molybdenum and tungsten as Group VIB metals typically comprises peaks at 2θ=13.1–14.9°, 29.7–30.3°, 33.1–34.0°, 33.6–34.2°, 43.5–44.1°, 52.8–53.4°, 56.9–57.5°, and 58.1–59.7°, with the peaks at 2θ=33.1–34.0° and 33.6–34.2° being overlapping. On the basis of this diffraction pattern it can be concluded that iron, molybdenum, and tungsten are present as iron sulfide (Fe$_{1-x}$S in, which x is about 0.1), molybdenum disulfide, and tungsten disulfide.

The X-ray diffraction pattern of a catalyst of the invention containing nickel as Group VIII non-noble metal and molybdenum and chromium as Group VIB metals typically comprises peaks at 2θ=13.1–14.9°, 30.0–30.60°, 33.1–34.0°, 45.2–45.8°, 53.3–53.9°, and 58.1–59.7°. On the basis of this diffraction pattern it can be concluded that nickel, molybdenum, and chromium are, int. al., present as nickel sulfide (Ni$_7$S$_6$), molybdenum disulfide, and chromium sulfide.

The X-ray diffraction pattern of a catalyst of the invention containing nickel as Group VIII non-noble metal and tungsten and chromium as Group VIB metals typically comprises peaks at 2θ=13.1–14.9°, 30.0–30.6°, 33.1–34.0°, 45.2–45.8°, 53.3–53.9°, and 58.1–59.7. On the basis of this diffraction pattern it can be concluded that nickel, tungsten, and chromium are, int. al., present as nickel sulfide (Ni$_7$S$_6$), molybdenum disulfide, and chromium sulfide The molar ratio of Group VIB to Group VIII non-noble metals generally ranges from 10:1–1:10 and preferably from 3:1–1:3. The ratio of the different Group VIB metals to one another generally is not critical. The same holds when more than one Group VIII non-noble metal is applied. In cases where molybdenum and tungsten are present as Group VIB metals, the molybenum:tungsten ratio preferably lies in the range of 9:1–1:19, more preferably 3:1–1:9, and most preferably 3:1–1:6.

The sulfidic bulk catalyst particles comprise at least one Group VIII non-noble metal component and at least two Group VIB metal components. Suitable Group VIB metals include chromium, molybdenum, tungsten, or mixtures thereof, with a combination of molybdenum and tungsten being most preferred. Suitable Group VIII non-noble metals include iron, cobalt, nickel, or mixtures thereof, preferably nickel and/or cobalt. Preferably, the catalyst particles comprise combinations of nickel/molybdenum/tungsten, cobalt/molybderium/tungsten or nickel/cobalt/molybdenum/tungsten.

If none of the above materials (binder material, cracking component, conventional hydroprocessing catalyst) has been added during precipitation step (i), the resulting bulk catalyst particles comprise about 100 wt % of the Group VIII non-noble-metals and Group VIB metals, based on the total weight of the bulk catalyst particles, calculated as metal oxides. If any of these materials has been added during precipitation step (i), the resulting bulk catalyst particles preferably comprise 30–100 wt %, more preferably 50–100 wt %, most preferably 70–100 wt % of the Group VIII non-noble metals and the Group VIB metals, based on the total weight of the bulk catalyst particles, calculated as metal oxides, the balance being any of the above described (further) materials added during precipitation step (i). The amount of Group VIB and Group VIII non-noble metals can be determined via TEM-EDX, AAS or ICP.

The median particle size of the sulfidic bulk catalyst particles depends on the precipitation method applied in step (i). If so desired, a particle size of 0.05–60 μm, preferably of 0.1–60 μm (measured via near forward scattering (Malvern technique)) can be obtained.

Preferably, the catalyst composition additionally comprises a suitable binder. Suitable binders preferably are those described above. The particles are embedded in the binder or vice versa, which binder or particles function as a glue to hold the particles or binder together. Preferably, the particles are homogeneously distributed within the binder. The presence of the binder generally leads to an increased mechanical strength of the final catalyst composition. Generally, the catalyst composition of the invention has a mechanical strength, expressed as side crush strength, of at least 1 lbs/mm and preferably of at least 3 lbs/mm (measured on extrudates with a diameter of 1–2 mm).

The amount of binder depends, int. al., on the desired activity of the catalyst composition. Binder amounts from 0–95 wt % of the total composition can be suitable, depending on the envisaged catalytic application. However, to take advantage of the unusually high activity of the composition of the present invention, the binder amounts generally are in the range of 0–75 wt % of the total composition, preferably 0–50 wt %, more preferably 0–30 wt %.

If desired, the catalyst composition may comprise a suitable cracking component. Suitable cracking components preferably are those described above. The amount of cracking component preferably is in the range of 0–90 wt %, based on the total weight of the catalyst composition.

Moreover, the catalyst composition may comprise conventional hydroprocessing catalysts. The conventional hydroprocessing catalyst generally comprises any of the above-described binder materials and cracking components. The hydrogenation metals of the conventional hydroprocessing catalyst generally comprise Group VIB and Group VIII non-noble metals such as combinations of nickel or cobalt with molybdenum or tungsten. Suitable conventional hydroprocessing catalysts are, e.g., hydrotreating or hydrocracking catalysts. These catalysts can be in the used, regenerated, fresh, or sulfided state.

Furthermore, the catalyst composition may comprise any further material, which is conventionally present in hydroprocessing catalysts, such as phosphorus-containing compounds, boron-containing compounds, silicon-containing compounds, fluorine-containing compounds, additional transition metals, rare earth metals, or mixtures thereof. Details in respect of these further materials are given above. The transition or rare earth metals generally are at least partly present in the sulfided form when the catalyst composition has been sulfided.

To obtain a sulfidic catalyst compositions with high mechanical strength, it may be desirable for the catalyst composition of the invention to have a low macroporosity. Preferably, less than 30% of the pore volume of the catalyst composition is in pores with a diameter higher than 100 nm (determined by mercury intrusion, contact angle: 130°), more preferably less than 20%.

The catalyst composition of the present invention generally comprises 10–100 wt %, preferably 25–100 wt %, more preferably 45–100 wt %, and most preferably 65–100 wt % of Group VIB and Group VIII non-noble metals, based on the total weight of the catalyst composition, calculated as metal oxides, the balance being any of the above (further) materials.

The present invention finally is directed to a shaped catalyst composition comprising
(i) sulfidic bulk catalyst particles comprising at least one Group VIII non-noble metal component and at least two Group VIB metal components and wherein the degree of sulfidation under conditions of use does not exceed 90%, and
(ii) a material selected from binder materials, cracking components, conventional hydroprocessing catalysts, or mixtures thereof.

Details with respect to the binder material, the cracking component, and the conventional hydroprocessing catalysts as well as the resulting catalyst composition have been provided above.

The shaped and sulfided catalyst particles may have many different shapes. Suitable shapes include spheres, cylinders, rings, and symmetric or asymmetric polylobes, for instance tri- and quadrulobes. Particles resulting from extrusion, beading or pilling usually have a diameter in the range of 0.2 to 10 mm, and their length likewise is in the range of 0.5 to 20 mm. Particles resulting from spray-drying generally have a median particle diameter in the range of 1 μm–100 μm.

Use According to the Invention

The catalyst composition according to the invention can be used in virtually all hydroprocessing processes to treat a plurality of feeds under wide-ranging reaction conditions, e.g., at temperatures in the range of 200 to 450° C., hydrogen pressures in the range of 5 to 300 bar, and space velocities (LHSV) in the range of 0.05 to 10 $h^{-1}$. The term "hydroprocessing" in this context encompasses all processes in which a hydrocarbon feed is reacted with hydrogen at elevated temperature and elevated pressure, including processes such as hydrogenation, hydrodesulfurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. The catalyst composition of the invention is particularly suitable for hydrotreating hydrocarbon feedstocks. Such hydrotreating processes comprise, e.g., hydrodesulfurization, hydrodenitrogenation, and hydrodearomatization of hydrocarbon feedstocks. Suitable feedstocks are, e.g., middle distillates, kero, naphtha, vacuum gas oils, and heavy gas oils. Conventional process conditions can be applied, such as temperatures in the range of 250–450° C., pressures in the range of 5–250 bar, space velocities in the range of 0.1–10 $h^{-1}$, and $H_2$/oil ratios in the range of 50–2000 Nl/l.

Characterization Methods

Degree of Sulfidation

Any sulfur contained in the sulfidic catalyst composition is oxidized in an oxygen flow by heating in an induction oven. The resulting sulfur dioxide is analyzed using an infrared cell with a detection system based on the IR characteristics of the sulfur dioxide. To obtain the amount of sulfur the signals relating to sulfur dioxide are compared to those obtained on calibration with well-known standards. The degree of sulfidation is then calculated as the ratio between the amount of sulfur contained in the sulfidic bulk catalyst particles and the amount of sulfur that would be present in the sulfidic bulk catalyst particles if all Group VIB and Group VIII non-noble metals are present in the form of their disulfides.

It will be clear to the skilled person that the catalyst to be measured for degree of sulfidation is handled under an inert atmosphere prior to the determination of the degree of sulfidation.

Side Crush Strength

First, the length of, e.g., an extrudate particle is measured and then the extrudate particle is subjected to compressive loading (25 lbs in 8.6 sec.) by a movable piston. The force required to crush the particle is measured. The procedure is repeated with at least 40 extrudate particles and the average is calculated as force (lbs) per unit length (mm). This method preferably is applied to shaped particles with a length not exceeding 7 mm.

$N_2$-adsorption

The $N_2$ adsorption measurement was carried out as described in the PhD thesis of J. C. P. Broekhoff (University of Technology Delft 1969).

The present invention is further illustrated by the following examples:

EXAMPLE 1

17.65 g of ammonium heptamolybdate (0.1 mole Mo) and 24.60 g of ammonium metatungstate (0.1 mole W) were dissolved in 800 ml of water giving a solution of a pH of about 5.2. To this solution, 0.4 mole of ammonium hydroxide (ca. 30 ml) was added, resulting in a pH increase to about 9.8. This solution was heated to 90° C. (solution A). A second solution was prepared by dissolving 58.2 g of cobalt nitrate (0.2 moles Co) in 50 ml of water. The solution was maintained at 90° C. (solution B). Solution B was added dropwise to solution A at a rate of 7 ml/min. The suspension that formed was stirred for 30 minutes while the temperature was maintained at 90° C. The material was filtered hot, washed with hot water, and dried in air at 120° C. Approximately 48 g of catalyst were recovered.

Subsequently, the resulting catalyst was sulfided: 1.5–2 g of the catalyst were placed in a quartz boat, which was inserted into a horizontal quartz tube and placed in a Lindberg furnace. The temperature was raised to 370° C. in about one hour with nitrogen flowing at 50 ml/min, and the flow continued for 1.5 h at 370° C. Nitrogen was switched off, and 10% $H_2S/H_2$ was then added to the reactor at 20 ml/min. The temperature was increased to 400° C. and held there for 2 hours. The heat was then shutoff and the catalyst cooled in flowing $H_2S/H_2$ to 70° C., at which point this flow was discontinued and the catalyst was cooled to room temperature under nitrogen.

The sulfided catalyst was evaluated in a 300 ml modified Carberry batch reactor designed for constant hydrogen flow. The catalyst was pilled and sized to 20/40 mesh and one gram was loaded into a stainless steel basket, sandwiched between layers of mullite beads. 100 ml of liquid feed, containing 5 wt % of dibenzothiophene (DBT) in decaline, were added to the autoclave. A hydrogen flow of 100 ml/min was passed through the reactor, and the pressure was maintained at 3150 kPa using a back-pressure regulator. The temperature was raised to 350° C. at 5–6° C./min and the test was run until either 50% of the DBT had been converted or 7 hours had passed. A small aliquot of product was removed every 30 minutes and analyzed by means of gas chromatography (GC). Rate constants for the overall conversion were calculated as described by M. Daage and R. R. Chianelli (J. Catal. 149, 414–427 (1994)).

The total DBT conversion (expressed as rate constant) at 350° C. ($\chi_{total}$) was measured to be $47*10^{16}$ molecules/ (g*s).

The sulfided catalyst had a degree of sulfidation under conditions of use of 58%.

The XRD pattern of the sulfided catalyst comprised peaks at 2θ=13.8°, 29.8°, 33.5°, 47.5°, 52.0°, and 58.9°. On the basis of this diffraction pattern it could be concluded that cobalt, molybdenum, and tungsten were present as cobalt sulfide ($Co_9S_8$), molybdenum disulfide, and tungsten disulfide.

EXAMPLE 2 (COMPARATIVE)

A catalyst was prepared as described in Example 1, except that only one Group VIB metal component was applied: a catalyst was prepared as described in Example 1 using 26.48 g of ammonium heptamolybdate (0.15 mole Mo), 0.3 mole $NH_4OH$ (c. 24 ml), and 43.66 g of cobalt nitrate (0.15 mole Co). The total DBT conversion (expressed as rate constant) at 350° C. ($\chi_{total}$) was measured to be $14.1*10^{16}$ molecules/ (g*s) and thus lay significantly below the corresponding value of Example 1.

EXAMPLES 3–6

For Examples 3–6, the following general procedures were applied:

a) General Preparation Method

The Group VIB metal components were dissolved and combined in a first reactor. The temperature was increased to 90° C. The Group VIII non-noble salt was dissolved in a second reactor and heated to about 90° C. Ammonium hydroxide was added to the first reactor to form a basic solution. The Group VIII non-noble metal solution was added to the first reactor dropwise with stirring in about 20 minutes. After 30 minutes, the precipitate was filtered and washed. The precipitate was dried in air overnight at 120° C. and thermally treated in air at 385° C. for 1 hour.

b) General Sulfidation Method

The catalysts were sulfided using a mixture of 10 vol % $H_2S$ in $H_2$ at atmospheric pressure (GHSV (gas hourly space velocity)=ca. 8700 $Nm^3*m^{-3}*hr^{-1}$). The catalyst temperature was increased from room temperature to 400° C., using a ramp of 6° C./min, and kept at 400° C. for 2 hours. The samples were then cooled down to room temperature in the $H_2S/H_2$ mixture.

EXAMPLE 3

The general preparation method as described above was used to prepare a precipitate from ammonium dimolybdate, ammonium metatungstate, and $Fe(NO_3)_3*9H_2O$. The resulting precipitate comprised 41.2 wt % $Fe_2O_3$, 21.3 wt % $MoO_3$, and 36.9 wt % $WO_3$ and was obtained in a yield of 98%. The B. E. T. surface area of the oxidic precipitate was 76 $m^2/g$. The pore volume of the oxidic precipitate as measured up to 60 nm by nitrogen adsorption using the adsorption curve was 0.15 ml/g. The calcined precipitate was then sulfided using the general sulfidation method described above.

The sulfided catalyst had a degree of sulfidation under conditions of use of 39%.

The XRD pattern of the sulfided catalyst comprised, e.g., peaks at 2θ=14.2°, 30.0°, 33.5°, 33.9°, 43.8°, 53.1°, 57.2°, and 59.0°, with the peaks at 2θ=33.5° and 33.9° being overlapping. On the basis of this diffraction pattern it could be concluded that iron, molybdenum, and tungsten were present as iron sulfide ($Fe_{1-x}S$ in which x is about 0.1), molybdenum disulfide, and tungsten disulfide.

EXAMPLE 4

The general preparation method as described above was used to prepare a precipitate from $Ni(NO_3)_2*6H_2O$, $(NH_4)_6Mo_7O_{24}*4H_2O$, and $(NH_4)_2Cr_2O_7$. The resulting precipitate comprised 52.2 wt % NiO, 29.4 wt % MoO$_3$, and 16.6 wt % Cr$_2$O$_3$ and was obtained in a yield of 88%. The B. E. T. surface area of the oxidic precipitate was 199 m$^2$/g. The pore volume of the oxidic precipitate as measured up to 60 nm by nitrogen adsorption using the adsorption curve was 0.28 ml/g. The catalyst was then sulfided using the general sulfidation method described above.

The degree of sulfidation of the sulfided catalyst under conditions of use was measured to be 49%.

The XRD pattern of the sulfided catalyst comprised, e.g., peaks at 2θ=14.2°, 30.3°, 33.4°, 45.5°, 53.6°, and 59.0°. On the basis of this diffraction pattern it could be concluded that nickel, molybdenum, and chromium were, int. al., present as nickel sulfide (Ni$_7$S$_6$), molybdenum disulfide, and chromium sulfide.

EXAMPLE 5

The general preparation method as described above was used to prepare a precipitate from Ni(NO$_3$)$_2$*6H$_2$O, (NH$_4$)$_6$H$_2$W$_{12}$O$_{40}$, and (NH$_4$)$_2$Cr$_2$O$_7$. The resulting precipitate comprised 44.0 wt % NiO, 42.4 wt % WO$_3$, and 11.8 wt % Cr$_2$O$_3$ and was obtained in a yield of 90%. The B. E. T. surface area of the oxidic precipitate was 144 m$^2$/g. The pore volume of the oxidic precipitate as measured up to 60 nm by nitrogen adsorption using the adsorption curve was 0.20 ml/g. The catalyst was then sulfided using the general sulfidation method described above.

The degree of sulfidation of the sulfided catalyst under conditions of use was measured to be 59%.

The XRD pattern of the sulfided catalyst comprised, e.g., peaks at 2θ=14.2°, 30.3°, 33.4°, 45.5°, 53.6°, and 59.0°. On the basis of this diffraction pattern it could be concluded that nickel, tungsten, and chromium were, int. al., present as nickel sulfide (Ni$_7$S$_6$), molybdenum disulfide, and chromium sulfide.

EXAMPLE 6

The general preparation method as described above was used to prepare a precipitate from Ni(NO$_3$)$_2$, ammonium heptamolybdate, and ammonium metatungstate. Alumina was peptized with HNO$_3$ and added to the slurried precipitate after the reaction was completed in an amount of 10 wt %, based on the total weight of the precipitate-alumina mixture. The precipitate-alumina mixture was then washed and the washed precipitate-alumina mixture was extruded. After extrusion, the extrudates were dried and thermally treated as described in the general preparation method. The extrudates contained about 10 wt % Al$_2$O$_3$, 35 wt % NiO, 20 wt % MoO$_3$, and 35 wt % WO$_3$. The resulting oxidic catalyst had a B. E. T. surface area of 119 m$^2$/g and a pore volume of 0.14ml/g, measured by nitrogen adsorption.

Part of the catalyst was then sulfided using the general sulfidation method described above.

The degree of sulfidation of the sulfided catalyst under conditions of use was measured to be 52%. The B. E. T. surface area of the sulfided catalyst composition was 66 m$^2$/g, and the pore volume was 0.12 ml/g, measured by nitrogen adsorption.

The sulfided catalyst was tested as described in Example 1. The total DBT conversion (expressed as rate constant) at 350° C. ($\chi_{total}$) was measured to be 111*10$^{16}$ molecules/ (g*s).

Another part of the catalyst was sulfided with a DMDS spiked feed. The thus sulfided catalyst was then tested with LCCO (light cracked cycle oil). The relative volume activity in hydrodenitrogenation was measured to be 178, compared to a commercially available alumina supported nickel and molybdenum-containing catalyst.

What is claimed is:

1. A process for preparing a catalyst composition comprising sulfidic bulk catalyst particles comprising at least one Group VIII non-noble metal and at least two Group VIB metals which comprises the following process steps
   (i) combination and reaction of at least one Group VIII non-noble metal component in solution and at least two Group VIB metal components in solution in a reaction mixture to obtain an oxygen-stable precipitate, and
   (ii) sulfidation of the precipitate,
      step (i) being carried out in an oxygen-containing atmosphere.

2. The process of claim 1 wherein precipitation is effected by pH change.

3. The process of claim 2 wherein the pH change is effected by the presence of a compound in the reaction mixture which decomposes upon the temperature being increased and thereby changes the pH.

4. The process of claim 1 wherein the Group VIII non-noble metal comprises cobalt, nickel, iron, or mixtures thereof.

5. The process of claim 4 wherein nickel and cobalt make up at least 50 wt. % of the total of Group VIII non-noble metal components, calculated as oxides.

6. The process of claim 4 wherein nickel and cobalt make up at least 70 wt. % of the total of Group VIII non-noble metal components, calculated as oxides.

7. The process of claim 4 wherein nickel and cobalt make up at least 90 wt. % of the total of Group VIII non-noble metal components, calculated as oxides.

8. The process of claim 1 wherein the Group VIB metals comprise at least two of chromium, molybdenum, tungsten.

9. The process of claim 8 wherein molybdenum and tungsten make up at least 50 wt. % of the total of Group VI metal components, calculated as trioxides.

10. The process of claim 8 wherein molybdenum and tungsten make up at least 70 wt. % of the total of Group VI metal components, calculated as trioxides.

11. The process of claim 8 wherein molybdenum and tungsten make up at least 90 wt. % of the total of Group VI metal components, calculated as trioxides.

12. The process of claim 1 wherein a material selected from a binder material, a cracking component, a conventional hydroprocessing catalyst, or mixtures thereof is added to the reaction mixture in step (i).

13. The process of claim 1 wherein the process comprises one or more of the additional process steps of
   (a) thermally treating, drying and/or washing,
   (b) compositing with a material selected from the group of binder materials, cracking components, conventional hydroprocessing catalysts, or mixtures thereof,
   (c) spray-drying, (flash) drying, milling, kneading, or slurry-mixing, dry or wet mixing, or combinations thereof,
   (d) shaping.

14. The process of claim 13 comprising the subsequent steps of
   combination and reaction of at least one Group VIII non-noble metal component in solution and at least two Group VIB metal components in solution in a reaction mixture to obtain an oxygen-stable precipitate
   optionally drying and/or washing
   compositing the precipitate with a material selected from the group of binder materials cracking components, conventional hydroprocessing catalysts, or mixtures thereof,
   optionally shaping
   sulfiding.

15. The process of claim 14 wherein a shaping step is carried out.

16. The process of claim 13 comprising the subsequent steps of combination and reaction of at least one Group VIII non-noble metal component in solution and at least two Group VIB metal components in solution in a reaction mixture to obtain an oxygen-stable precipitate, with a material selected from the group of binder materials, cracking components, conventional hydroprocessing catalysts, or mixtures thereof, being present during the precipitation optionally drying and/or washing optionally shaping sulfiding.

17. The process of claim 16 wherein a shaping step is carried out.

18. A catalyst composition comprising sulfidic bulk catalyst particles which comprise at least one Group VIII non-noble metal component and at least two Group VIB metal components, the catalyst composition being essentially free of Group VIII non-noble metal disulfides, wherein the Group VIII non-noble metals are present as (Group VIII non-noble metal)$_y$S$_x$, with x/y being in the range of 0.5–1.5.

19. A process for hydroprocessing a hydrocarbon feedstock comprising treating said hydrocarbon feedstock with the catalyst of claim 18 with hydrogen at elevated temperature and elevated pressure.

20. The catalyst composition of claim 18 wherein nickel and cobalt make up at least 50 wt. % of the total of Group VIII non-noble metal components, calculated as oxides.

21. The catalyst composition of claim 18 wherein nickel and cobalt make up at least 70 wt. % of the total of Group VIII non-noble metal components, calculated as oxides.

22. The catalyst composition of claim 18 wherein nickel and cobalt make up at least 90 wt. % of the total of Group VIII non-noble metal components, calculated as oxides.

23. The catalyst composition of claim 18 wherein the Group VIII non-noble metal components consist essentially of nickel and/or cobalt.

24. The catalyst composition of claim 18 wherein molybdenum and tungsten make up at least 50 wt. % of the total of Group VIB metal components, calculated as trioxides.

25. The catalyst composition of claim 18 wherein molybdenum and tungsten make up at least 70 wt. % of the total of Group VIB metal components, calculated as trioxides.

26. The catalyst composition of claim 18 wherein molybdenum and tungsten make up at least 90 wt. % of the total of Group VIB metal components, calculated as trioxides.

27. The catalyst composition of claim 18 wherein the Group VIB metal components consist essentially of molybdenum and tungsten.

28. The catalyst composition of claim 18 wherein the molar ratio of Group VIB to Group VIII non-noble metals ranges from 10:1–1:10.

29. The catalyst composition of claim 18 wherein the molar ratio of Group VIB to Group VIII non-noble metals ranges from 3:1–1:3.

30. The catalyst composition of claim 18 wherein molybdenum and tungsten are present as Group VIB metals and wherein the molybdenum:tungsten ratio lies in the range of 9:1–1:19.

31. The catalyst composition of claim 30 wherein the molybdenum: tungsten ratio lies in the range of 3:1–1:9.

32. The catalyst composition of claim 30 wherein the molybdenum: tungsten ratio lies in the range of 3:1–1:6.

33. The catalyst composition of claim 18 which comprises 45–100 wt. % of Group VIB and Group VIII non-noble metals, based on the weight of the catalyst, calculated as metal oxides.

34. The catalyst composition of claim 18 which comprises 65–100 wt. % of Group VIB and Group VIII non-noble metals, based on the weight of the catalyst, calculated as metal oxides.

* * * * *